R. J. BURROWS.
AXLE FOR MOTOR VEHICLES.
APPLICATION FILED MAY 15, 1917.

1,265,742.

Patented May 14, 1918.

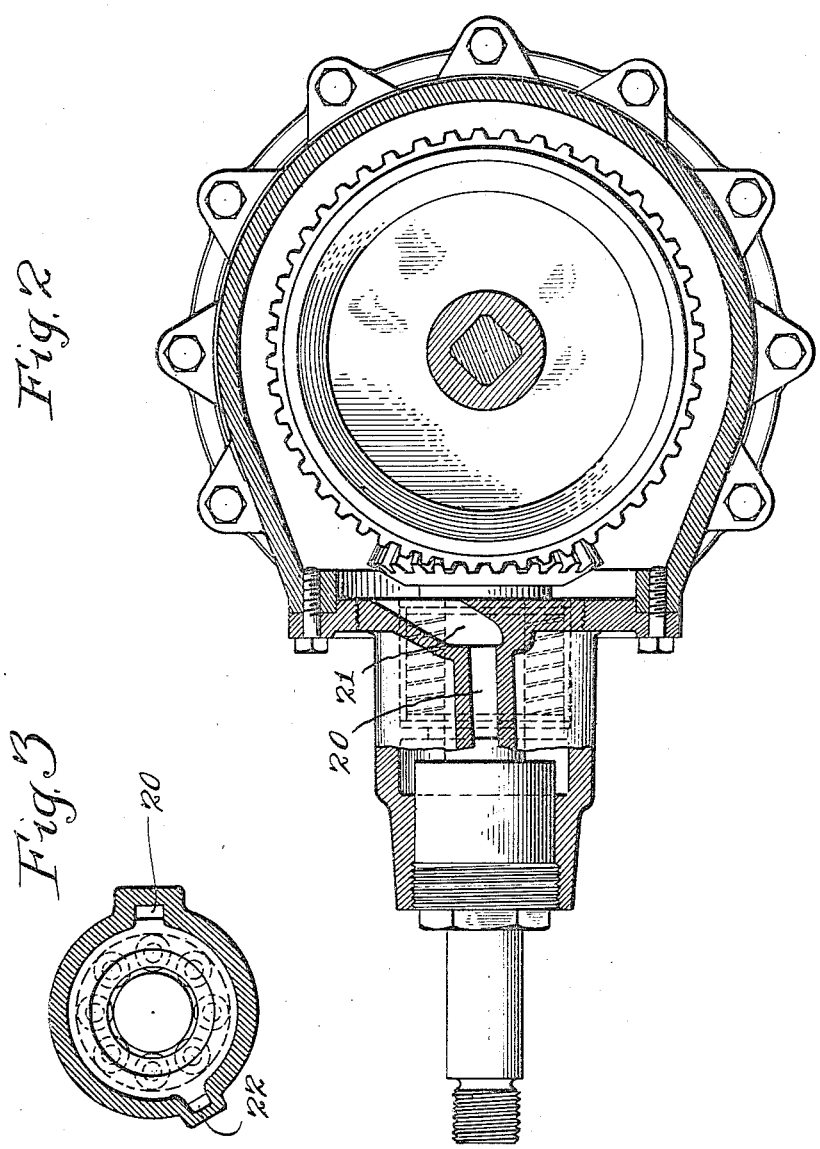

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR-VEHICLES.

1,265,742.   Specification of Letters Patent.   Patented May 14, 1918.

Application filed May 15, 1917. Serial No. 168,671.

*To all whom it may concern:*

Be it known that I, ROBERT J. BURROWS, a citizen of the United States, and a resident of Buchanan, in the county of Berrien and State of Michigan, have invented certain new and useful Improvements in Axles for Motor-Vehicles, of which the following is a specification, reference being had to the accompanying drawings.

My invention relates to motor vehicle axles in which the propelling power is transmitted through a propeller or drive-shaft to the usual differential mechanism contained in a suitable housing, and has for its object to provide an improved construction by which the propeller shaft bearings are always efficiently lubricated. I accomplish this object as illustrated in the accompanying drawings and as hereinafter described. That which I believe to be new is set forth in the claims.

In the accompanying drawings, in which I have illustrated my invention as applied to an axle such as that shown in my pending application Serial No. 859,429, filed August 31, 1914,—

Fig. 2 is a vertical section on line 2—2 of Fig. 1; and

Fig. 3 is a vertical cross-section on line 3—3 of Fig. 1.

Referring to the drawings,—

Figure 1:
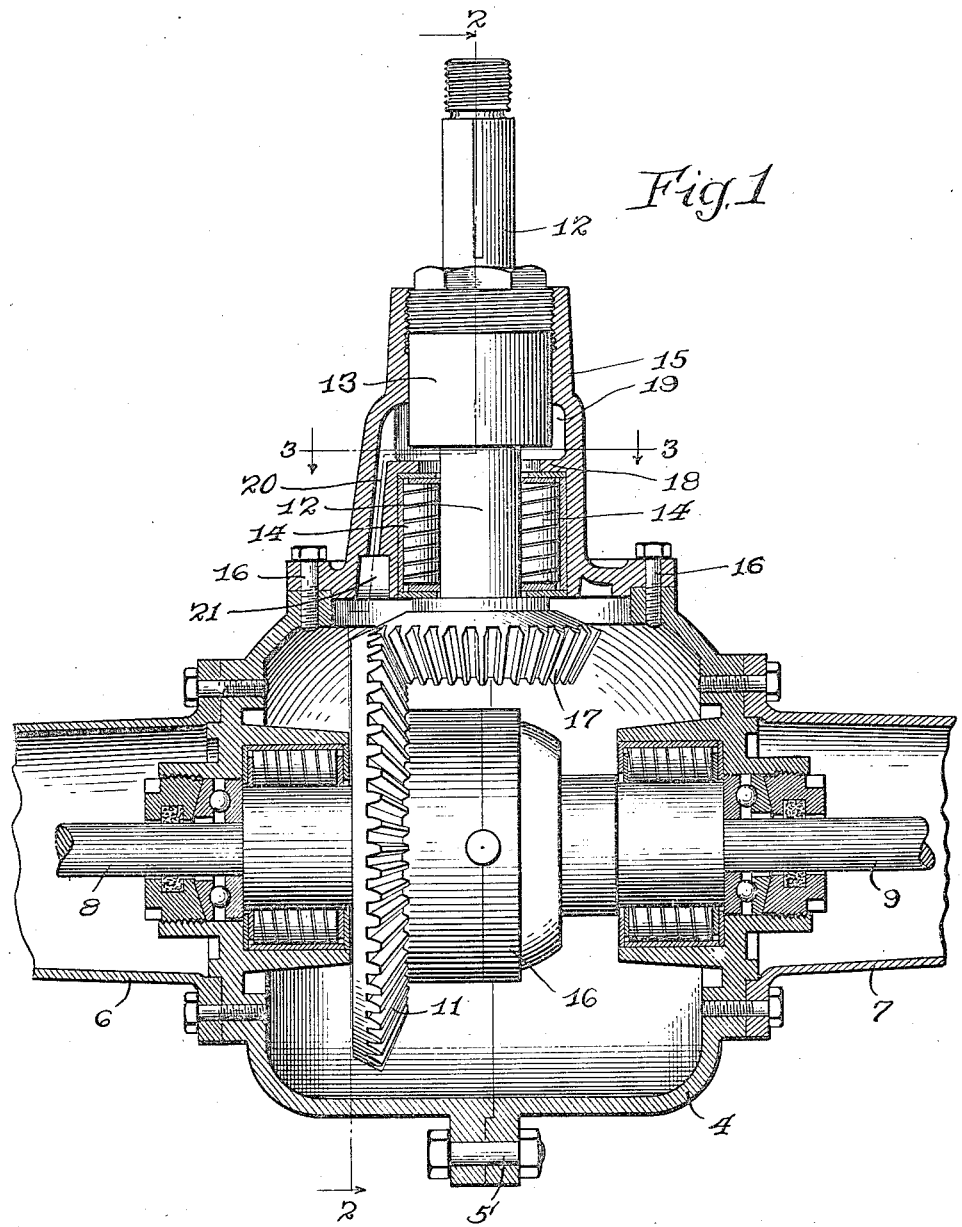
Figure 1 is a horizontal sectional view of the central portion of the axle housing with the parts carried thereby.

4 indicates the central portion of the rear axle housing, which is preferably made in two sections connected by bolts 5, but it may be of any other approved construction. 6—7 indicate laterally-extending tubular members, which are connected to opposite sides of the housing 4 and inclose the usual live axle members or jack-shafts 8—9 by which power is transmitted to the vehicle wheels in any suitable way, as by internal gears. 10 indicates the usual differential gearing, and 11 the usual main driving gear, all of which may be of any approved construction. 12 indicates the propeller or drive shaft which is journaled in suitable ball-bearings 13 and roller-bearings 14 mounted in a sleeve 15 secured to the forward side of the housing 4 by bolts 16. The drive shaft 12 carries at its inner end a beveled pinion 17 which meshes with the drive gear 11, as shown in Fig. 1. 18 indicates an internally-projecting flange arranged midway of the length of the sleeve 15 and forming an abutment for the forward ends of the roller-bearings 14. Between the flange 18 and the forward portion of the sleeve 15, which fits closely upon the ball-bearing 13, is an oil chamber or reservoir 19. 20 indicates a duct leading from said chamber around the roller-bearings 14 to the interior of the housing 4, said duct having an enlarged flaring opening 21 at its rear end, as best shown in Figs. 1 and 2. 22 indicates another duct leading from the lower portion of the reservoir 19 back to the interior of the housing 4, as shown in Fig. 3. The latter duct forms a return channel adapted to conduct surplus oil from the reservoir 19 back to the interior of the housing 4.

In practice, the housing 4 is supplied with sufficient oil to immerse the lower portion of the drive-gear 11 and pinion 17, and it will be apparent that when the vehicle is in motion, said gears will throw or pump the oil through the duct 20 to the reservoir 19, thus lubricating the ball-bearings 13 and roller-bearings 14, since there is free communication between said bearings and the reservoir 19. The surplus oil will flow back to the housing 4 through the return channel 22. Thus the bearings of the drive-shaft 12 are given thorough and constant lubrication without the necessity of packing them with grease or the use of grease cups, both of which are objectionable.

It will be understood that my invention is not limited in its application to an axle of the particular type shown, but may be applied to any other axle to which it is adapted.

That which I claim as my invention, and desire to secure by Letters Patent, is,—

1. An axle for motor vehicles, comprising a suitable housing, a drive-gear adapted to rotate therein, a sleeve connected to said housing, a drive-shaft extending through said sleeve, said shaft being geared to said drive-gear, and bearings in said sleeve for said shaft, said sleeve having a duct to permit oil to flow from said housing to said bearings.

2. An axle for motor vehicles, comprising a suitable housing, a drive-gear adapted to rotate therein, a sleeve connected to said housing, a drive-shaft extending through said sleeve, said shaft being geared to said drive-gear, and bearings in said sleeve for said shaft, said sleeve having a plurality of ducts to permit oil to flow from said housing to said bearings and back to said housing.

3. An axle for motor vehicles, comprising a suitable housing, a drive-gear adapted to rotate therein, a sleeve connected to said housing, a drive-shaft extending through said sleeve, said shaft being geared to said drive-gear, and bearings in said sleeve for said shaft, said sleeve having a duct for conducting oil from said housing to said bearings.

4. An axle for motor vehicles, comprising a suitable housing, a drive-gear adapted to rotate therein, a sleeve connected to said housing, a drive-shaft extending through said sleeve, said shaft being geared to said drive-gear, and bearings in said sleeve for said shaft, said sleeve having a duct for conducting oil from said housing to said bearings, and a return duct for conducting surplus oil back to said housing.

5. An axle for motor vehicles, comprising a suitable housing, a drive-gear adapted to rotate therein, a sleeve connected to said housing, a drive-shaft extending through said sleeve, said shaft being geared to said drive-gear, and a plurality of sets of bearings for said shaft in said sleeve, said sleeve having a duct to permit oil to flow from said housing to said sets of bearings.

6. An axle for motor vehicles, comprising a suitable housing, a drive-gear adapted to rotate therein, a sleeve connected to said housing, a drive-shaft extending through said sleeve, said shaft being geared to said drive-gear, and a plurality of sets of bearings for said shaft in said sleeve, said sleeve having a duct for conducting oil from said housing to said shaft between said sets of bearings.

7. An axle for motor vehicles, comprising a suitable housing, a drive-gear adapted to rotate therein, a sleeve connected to said housing, a drive-shaft extending through said sleeve, said shaft being geared to said drive-gear, and a plurality of sets of bearings for said shaft in said sleeve, said sleeve having a duct for conducting oil from said housing to said shaft between said sets of bearings, said sleeve also having a return duct for conducting surplus oil back to said housing.

8. An axle for motor vehicles, comprising a suitable housing, a drive-gear adapted to rotate therein, a sleeve connected to said housing, a drive-shaft extending through said sleeve, said shaft being geared to said drive-gear, bearings for said shaft fitted in the outer portion of said sleeve, bearings for said shaft between said first-mentioned bearings and the inner end of said shaft, said sleeve having a duct for conducting oil from said housing to said shaft intermediately of said inner and outer bearings.

9. An axle for motor vehicles, comprising a suitable housing, a drive-gear adapted to rotate therein, a sleeve connected to said housing, a drive-shaft extending through said sleeve, said shaft being geared to said drive-gear, bearings for said shaft fitted in the outer portion of said sleeve, and bearings for said shaft between said first-mentioned bearings and the inner end of said shaft, said sleeve having a chamber disposed intermediately therein around the adjacent ends of said inner and outer bearings, said chamber being in communication with said housing whereby oil will flow from said housing to said chamber.

10. An axle for motor vehicles, comprising a suitable housing, a drive-gear adapted to rotate therein, a sleeve connected to said housing, a drive-shaft extending through said sleeve, said shaft being geared to said drive-gear, bearings for said shaft fitted in the outer portion of said sleeve, and bearings for said shaft between said first-mentioned bearings and the inner end of said shaft, said sleeve having a chamber disposed intermediately therein around the adjacent ends of said inner and outer bearings, said chamber being connected by ducts with said housing.

11. An axle for motor vehicles, comprising a suitable housing, a drive-gear adapted to rotate therein, a sleeve connected to said housing, a drive-shaft extending through said sleeve, said shaft being geared to said drive-gear, a ball-bearing fitted closely in the outer portion of said sleeve and roller-bearings for said shaft between said ball-bearings and the inner end of said shaft, said sleeve having a duct for conducting oil from said housing to said shaft between said ball and roller bearings.

12. The combination of live axle members, a housing for said axle members, a drive-shaft, a sleeve connected with said housing and surrounding said drive-shaft, and a bearing in said sleeve for said shaft, said sleeve having an oil reservoir adjacent the outer end of said bearing, and also having a duct leading from said housing to said reservoir.

13. The combination of live axle members, a housing for said axle members, a drive-shaft, a sleeve connected with said housing and surrounding said drive-shaft, and ball and roller bearings in said sleeve for said shaft, said sleeve having an oil reservoir between said ball and roller bearings, and having a duct leading from said housing to said reservoir.

ROBERT J. BURROWS.